United States Patent
Cheng et al.

(10) Patent No.: US 11,379,284 B2
(45) Date of Patent: Jul. 5, 2022

(54) TOPOLOGY-INSPIRED NEURAL NETWORK AUTOENCODING FOR ELECTRONIC SYSTEM FAULT DETECTION

(71) Applicant: NEC Laboratories America, Inc., Princeton, NJ (US)

(72) Inventors: Wei Cheng, Princeton Junction, NJ (US); Haifeng Chen, West Windsor, NJ (US); Masanao Natsumeda, Princeton Junction, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/245,734

(22) Filed: Jan. 11, 2019

(65) Prior Publication Data

US 2019/0286506 A1    Sep. 19, 2019

Related U.S. Application Data

(60) Provisional application No. 62/642,165, filed on Mar. 13, 2018.

(51) Int. Cl.
*G06F 11/07* (2006.01)
*H04L 67/12* (2022.01)
(Continued)

(52) U.S. Cl.
CPC ...... *G06F 11/0709* (2013.01); *G06F 11/0793* (2013.01); *G06K 9/6267* (2013.01); *G06N 3/088* (2013.01); *H04L 67/12* (2013.01)

(58) Field of Classification Search
CPC ............. G06F 11/0709; G06F 11/0793; G06K 9/6267; G06N 3/088; G06N 3/0445;
(Continued)

(56) References Cited

U.S. PATENT DOCUMENTS

| 8,185,781 B2 | 5/2012 | Chen et al. | |
| 2018/0159879 A1* | 6/2018 | Mestha | G06N 20/00 |
| 2019/0391574 A1* | 12/2019 | Cheng | G05B 23/024 |

OTHER PUBLICATIONS

Viswanathan et al., "Ranking Anomalies in Data Centers", IEEE, 2012 (Year: 2012).*

(Continued)

*Primary Examiner* — Bryce P Bonzo
*Assistant Examiner* — Michael Xu
(74) *Attorney, Agent, or Firm* — Joseph Kolodka

(57) ABSTRACT

Systems and methods for fault detection in a sensor network include receiving sensor data from sensors in the sensor network with a communication device. The sensor data is analyze to determine if the sensor data is indicative of a fault with a fault detection model, the fault detection model including; predicting the sensor data with an autoencoder by encoding the sensor data and decoding encoded the sensor data, autoregressively model the sensor data with an autoregressor, combining the modeled sensor data and the predicted sensor data with a combiner to produce reconstructed sensor data, and comparing the reconstructed sensor data to the sensor data with an anomaly evaluator to determine anomalies. An anomaly classification is produced by comparing the anomalies to historical anomalies with an anomaly classifier. Faults in the sensor network are automatically mitigated with a processing device based on the anomaly classification.

20 Claims, 7 Drawing Sheets

(51) Int. Cl.
*G06K 9/62* (2022.01)
*G06N 3/08* (2006.01)

(58) Field of Classification Search
CPC ...... G06N 3/0454; G06N 3/084; G06N 5/045;
H04L 67/12; H04L 63/1425; H04L
67/125; H04W 12/12; H04W 4/38
See application file for complete search history.

(56) References Cited

OTHER PUBLICATIONS

Malhotra et al., "LSTM-based Encoder-Decoder for Multi-sensor Anomaly Detection", ICML, 2016 Anomaly Detection Workshop, New York, NY, USA, 2016. (Year: 2016).*
Yemini, "High Speed and Robust Event Correlation", IEEE Communications Magazine, vol. 34, Issue 5, May 1996, pp. 82-90.
Chen, "Exploiting Local and Global Invariants for the Management of Large Scale Information Systems", IEEE International Conference on Data Mining, Dec. 2008, pp. 113-122.
Hochreiter, "Long Short-Term Memory", Neural Computation, vol. 9, Issue 8, Nov. 1997, pp. 1735-1780.
Cheng, "Ranking Causal Anomalies via Temporal and Dynamical Analysis on Vanishing Correlations", KDD, Aug. 2016, 10 pages.

\* cited by examiner

TOPOLOGY-INSPIRED NEURAL NETWORK AUTOENCODING FOR ELECTRONIC SYSTEM FAULT DETECTION

RELATED APPLICATION INFORMATION

This application claims priority to U.S. Provisional Application 62/642,165, filed on Mar. 13, 2018, incorporated herein by reference herein its entirety.

BACKGROUND

Technical Field

The present invention relates to fault detection in electronic systems and more particularly topology-inspired neural network autoencoding for fault detection in electronic systems.

Description of the Related Art

A variety of electronic systems, such as, e.g., store registers, retail store showcases, power plants, heating, ventilation and air condition (HVAC) systems, among other electronically controlled systems, can monitor both physical and electronic states of the electronic system using a variety of sensor techniques. To determine when the electronic system experiences a failure or fault related to the physical and electronic states, analysis of sensor behavior can be used. Accordingly, a system can be equipped to conduct surveillance of the electronic system to analyze behaviors and diagnose faults and failures. Quickly and accurately discovering a failure can result in reduced downtime as well as reduced hazards, among other issues related to a fault, thus decreasing costs associated with faults and increasing safety.

SUMMARY

According to an aspect of the present invention, a method is provided for fault detection in a sensor network. The method includes receiving sensor data from sensors in the sensor network with a communication device. The sensor data is analyze to determine if the sensor data is indicative of a fault with a fault detection model, the fault detection model including; predicting the sensor data with an autoencoder by encoding the sensor data and decoding encoded the sensor data, autoregressively modelling the sensor data with an autoregressor, combining the modeled sensor data and the predicted sensor data with a combiner to produce reconstructed sensor data, and comparing the reconstructed sensor data to the sensor data with an anomaly evaluator to determine anomalies. An anomaly classification is produced by comparing the anomalies to historical anomalies with an anomaly classifier. Faults in the sensor network are automatically mitigated with a processing device based on the anomaly classification.

According to another aspect of the present invention, a method is provided for fault detection in a sensor network. The method includes receiving sensor data from sensors in the sensor network with a communication device. The sensor data is logged in an event log to form time-series of sensor data. The sensor data is analyzed to determine if the sensor data is indicative of a fault with a fault detection model, the fault detection model including; predicting the sensor data with an autoencoder by encoding the sensor data and decoding encoded the sensor data, autoregressively modelling the sensor data with an autoregressor, combining the modeled sensor data and the predicted sensor data with a combiner to produce reconstructed sensor data, comparing the reconstructed sensor data to the sensor data with an anomaly evaluator to determine anomalies, and ranking the anomalies according to a difference between the reconstructed sensor data and the sensor data. An anomaly classification is produced by comparing the anomalies to historical anomalies with an anomaly classifier. Faults in the sensor network are automatically mitigated with a processing device based on the anomaly classification.

According to another aspect of the present invention, a system is provided for fault detection in a sensor network with a fault detection system to detect faults. The system includes a communication device to receive sensor data from sensors in the sensor network. A fault detection model analyzes the sensor data to determine if the sensor data is indicative of a fault, the fault detection model including; an autoencoder that encodes the sensor data and decodes the encoded sensor data to predict the sensor data, an autoregressor that autoregressively models the sensor data, a combiner that combines the modeled sensor data and the predicted sensor data to produced reconstructed sensor data, and an anomaly evaluator that compares the reconstructed sensor data to the sensor data to determine anomalies. An anomaly classifier compares the anomalies to historical anomalies and produces an anomaly classification. A processing device automatically mitigates faults in the sensor network based on the anomaly classification.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
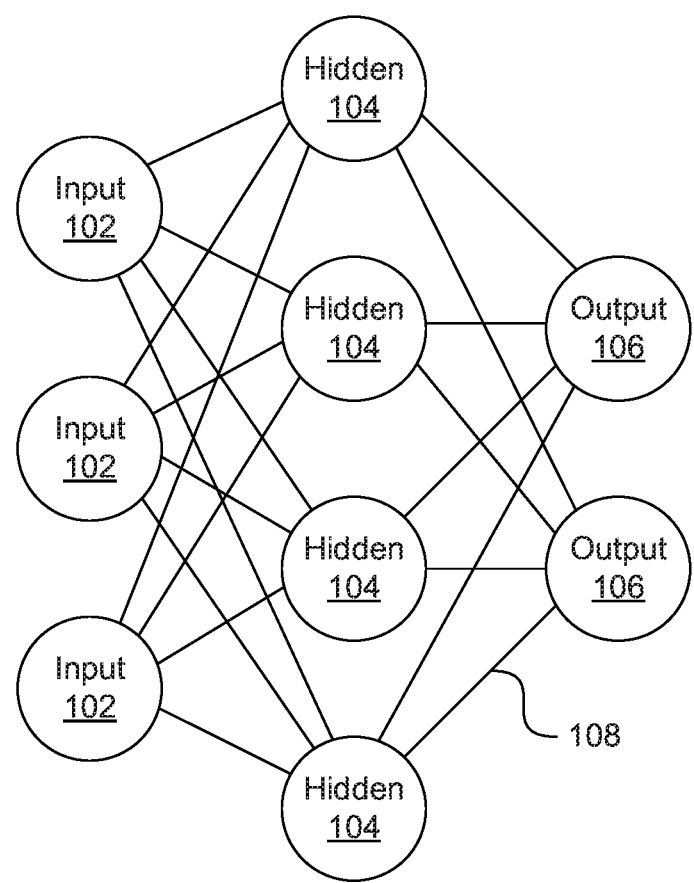
FIG. 1 is a generalized diagram of a neural network, in accordance with the present invention.

In accordance with the present invention, systems and methods are provided for automatic fault detection with topology-inspired neural network autoencoding.

In one embodiment, a fault detection system is implemented in communication with a system or network. The system or network includes, for example, a power grid, however, the fault detection system can be implemented in any system that monitors physical systems using electronic sensors. Thus, the fault detection system facilitates real-time analysis of sensor data to determine if or when a fault in the system occurs, such as, e.g., the power grid.

The fault detection system operates through the use of an autoencoder trained to recognize normal sensor data of the monitored system. Because such data is time varying, highly multi-variate and often asynchronous, the autoencoder includes an autoregressive model and long short-term memory. By combining an autoencoder to capture time-varying data relationships, and an autoregressive model to compensate for asynchronous data, the fault detection system can better operate in a real-world system to analyze sensor data in real-time. Thus, the fault detection system can more accurately and more efficiently recognize behavior that is outside of normal operating behavior on which the fault detection system is trained.

Thus, the fault detection system monitors the system behaviors to detect and recognize anomalous behaviors that may correspond to faults. The suspected faults are finger-printed according to behavior and recorded. The suspected faults can then be compared to past confirmed faults according to, e.g., similarities in fingerprints. Where the fingerprints of the suspected faults match past faults, the suspected faults are verified as faults having a type and a method of response corresponding to the matched past fault. The fault detection system can then automatically perform fault mitigation according to the method of response. For example, the fault detection system can, e.g., automatically notify an administrator via a display or speaker, shut down or reset a particular portion of the system, issue a general alert to users or customers, redistribute resources, or perform any other appropriate action. Thus, the faults can be identified and addressed more quickly, efficiently and accurately, with less need for human intervention. Because of the reduced human oversight, faults can be addressed more quickly and with reduced costs.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
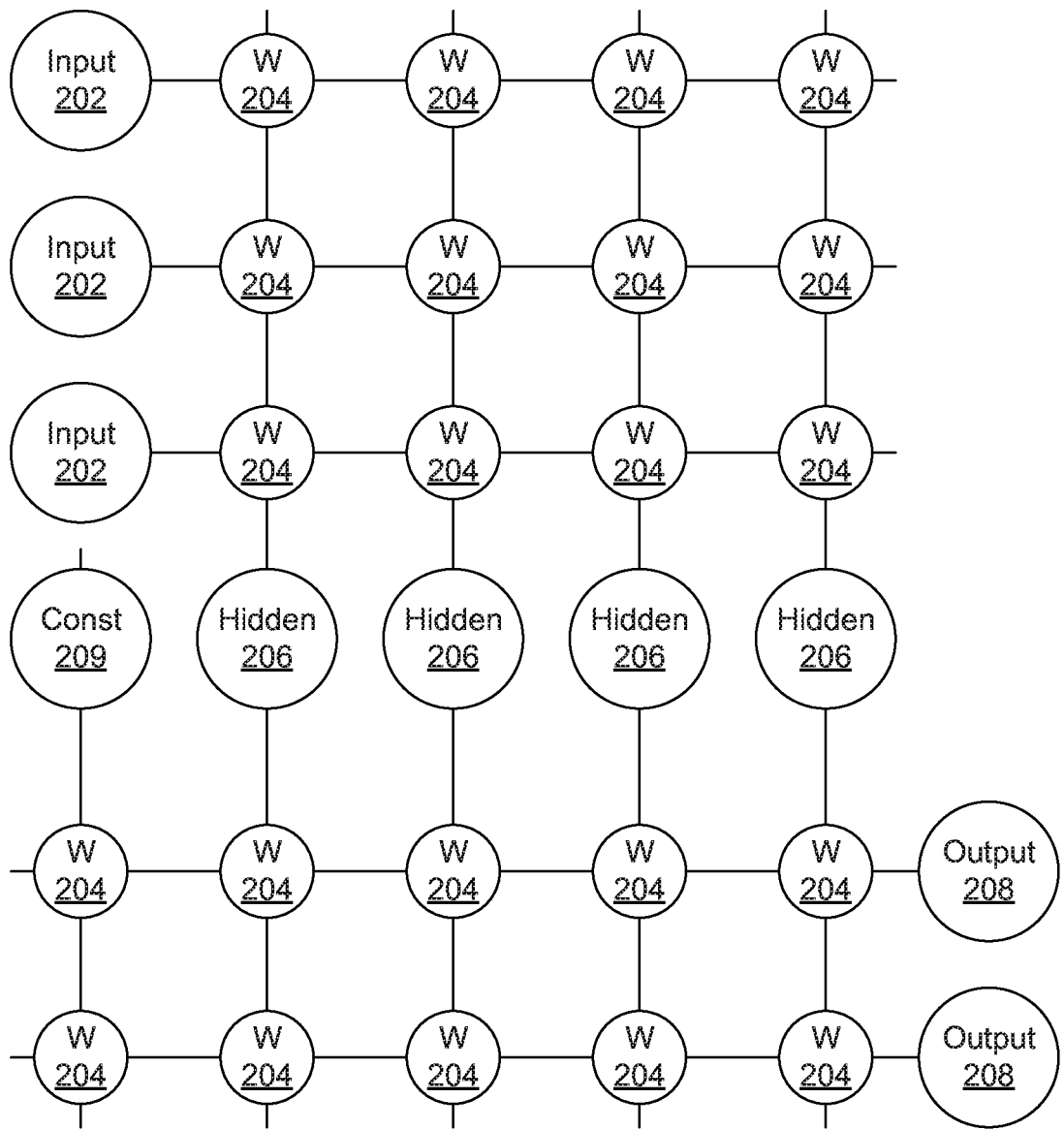
FIG. 2 is a block/flow diagram illustrating an artificial neural network (ANN) architecture, in accordance with the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

Figure 3:
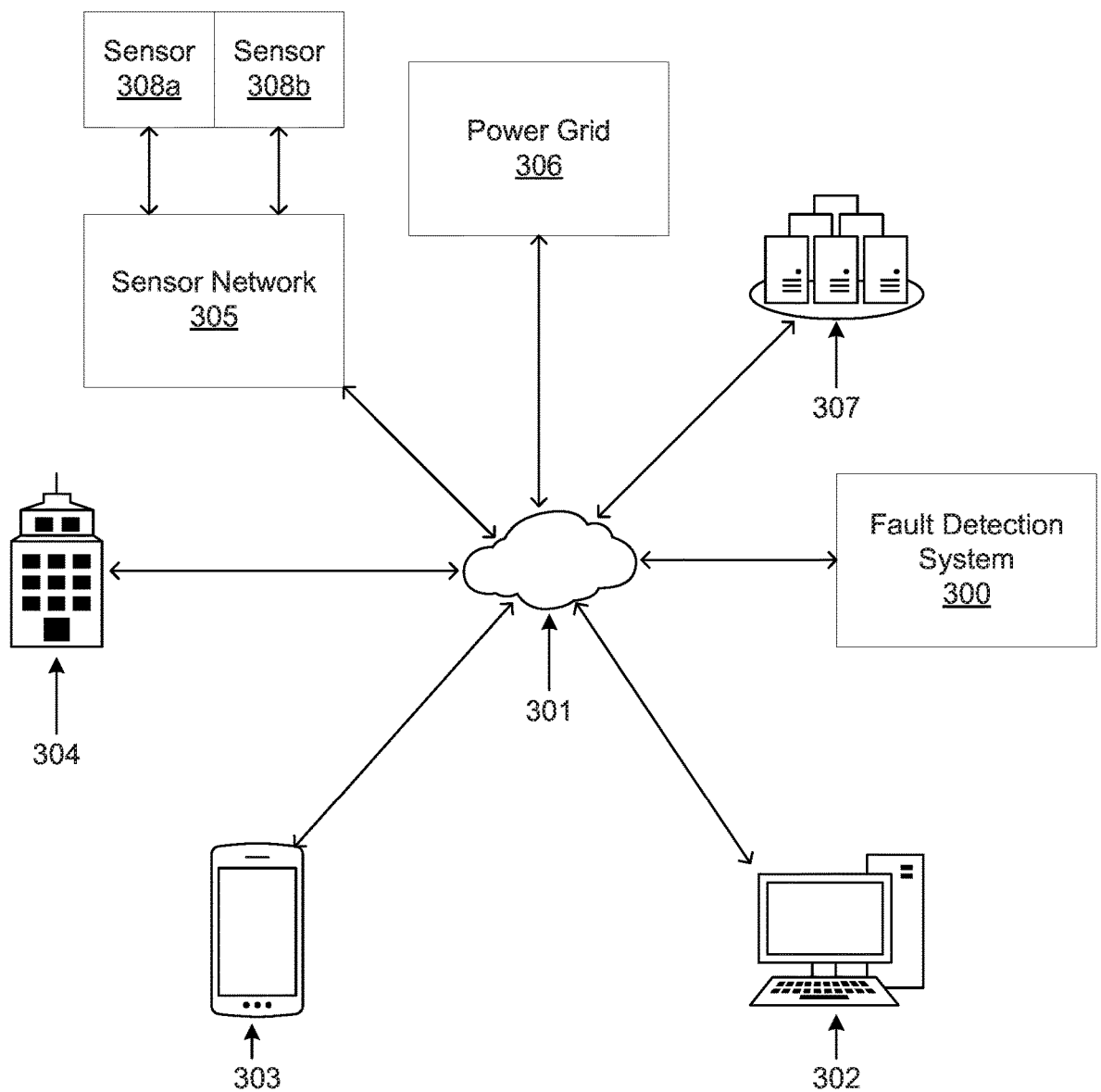
FIG. 3 is a diagram illustrating a network monitored by a topology-inspired neural network for fault detection, in accordance with the present invention.

Referring now to FIG. 3, a system/method for a network monitored by a topology-inspired neural network for fault detection is illustratively depicted in accordance with an embodiment of the present invention.

According to aspects of the present invention, a fault detection system 300 is in communication with a network 301, such as, e.g., a cloud network, the Internet, an intranet, or other network. Via the network 301, the fault detection system 300 can monitor systems such as, e.g., a building 304 including a heating, ventilation and air conditioning (HVAC) system, a power grid 306 and other sensor network 305. The sensor network 305 can be any network of sensors 308a and 308b including, e.g., another HVAC system of a building or a power grid.

The fault detection system 300 retrieves a data stream from each of the monitored systems across the network 301. For example, the sensor network 305 can provide sensor data from each of the sensors 308a and 308b across the network 301 to the fault detection system 300. The fault detection system 300 can log the sensor data, e.g., in a memory or storage device, or in a database 307 via the network 301. Thus, the fault detection system 300 can maintain a record of sensor data from the sensor network 305. Similarly, the fault detection system 300 can also maintain a record of sensor data from the building 304 utilities, such as, e.g., HVAC, as well as power grid 306 behavior.

The fault detection system 300 analyzes the sensor data to determine the presence of faults or other anomalies in the sensor network 305. For example, the fault detection system 300 can, e.g., learn from the record of sensor data in the database 307 to recognize normal operating behavior of sensors and other devices in the sensor network 305. Thus, for example, the fault detection system 300 can determine a suspected fault where received sensor data does not match the learned normal behavior. However, other methods of fault detection are contemplated.

The fault detection system 300 classifies suspected faults according to types of faults. The type of a fault can relate to, e.g., effective responses for similar faults, particular variations from normal behavior, or other form of classification. According one possible embodiment, the fault detection system 300 determines a fault classification by, e.g., storing the record of sensor data as a fingerprint according to a format of the record and comparing the fingerprint against past detected faults. However, the fault detection system 300 can, alternatively, classify faults according to pre-defined classifications of behavior variations, such as, e.g., with a human annotated training set.

Classifying a suspected fault at once verifies the fault as well as categorizes the fault. As such, the fault can be associated with one or more actions to address the fault of the corresponding category. As such, the fault detection system 300 can automatically address the fault according to the associated actions, such as, e.g., notifying an administrator via the display and/or speaker of a computer 302 or mobile device 303 in communication with the network 301. Additionally, the fault detection system 300 can address faults by, e.g., shutting down systems and equipment that are malfunctioning, as indicated by the fault, shutting down or resetting devices to prevent hazardous situations caused by or associated with the fault, dispatching maintenance teams, issuing public alerts via the internet, email, simple messaging service (SMS) or other communication medium, or any other appropriate response to the fault.

The suspected fault can then be communicated to the database 307 to be recorded as a fault. In the event that past faults do not match the suspected fault, the suspected fault can be recorded according to a new classification. Otherwise, the suspected fault is recorded according to the classification determined as described above. Thus, the suspected fault is added to the historical record of faults for improved training of the fault detection system for identifying anomalies and associated faults.

Figure 4:
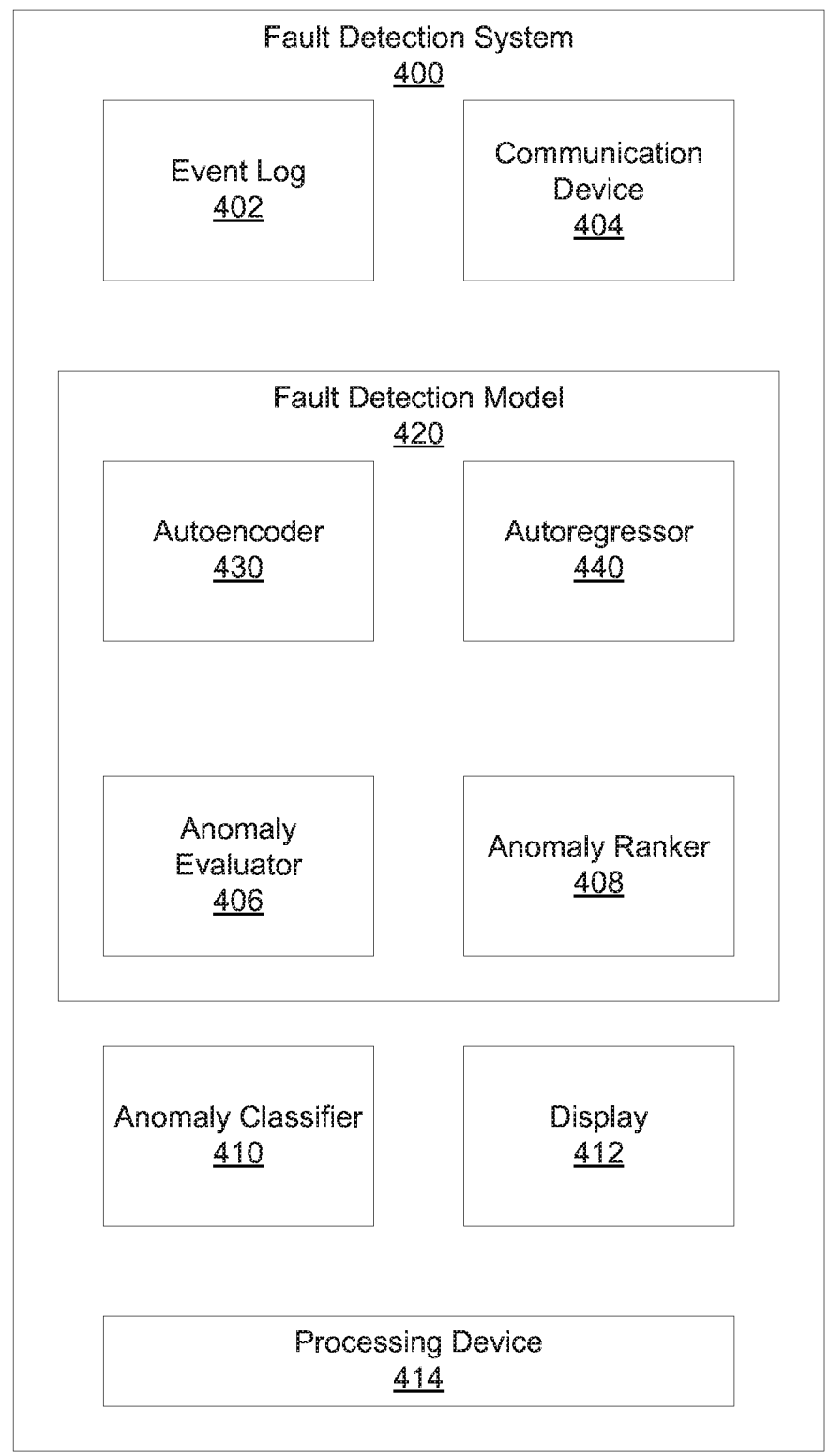
FIG. 4 is a block/flow diagram illustrating a fault detection system with topology-inspired neural network autoencoding for fault detection, in accordance with the present invention.

Referring now to FIG. 4, a block/flow diagram illustrating a fault detection system with topology-inspired neural network autoencoding for fault detection is illustratively depicted in accordance with an embodiment the present invention.

According to aspects of an embodiment of an embodiment of the present invention, a fault detection system 400 can include an event log 402 and a communication device 404. The communication device 404 can communicate with electronic systems to receive sensor data from, e.g., a sensor network including, e.g., a power grid, a retail store showcase, security systems such as building and home security, or other sensor networks. Thus, the communication device 404 can receive sensor data from the sensor network on, e.g., a continual basis, or, alternatively, periodically, such as, e.g., on a minute basis, hourly, daily, weekly, or monthly, or combinations thereof.

Received sensor data can be stored in the event log 402, which can be, e.g., a storage or memory device such as, e.g., a hard drive, a solid state drive, flash storage, a cloud database, random access memory (RAM), or other storage device. Thus, the event log 402 can maintain a record over time of sensor data. The event log 402 can maintain the record for a given period, such as, e.g., for one day, multiple days, a week or a month, or for another desirable period, before deleting the data to make room for new sensor data. Alternatively, the event log 402 can maintain a rolling log of sensor data where the oldest data is deleted upon receipt of new data or in anticipation of new data.

Using the event log 402, the fault detection system 400 can analyze sensor data to determine anomalous behavior. For such analysis, the fault detection system 400 includes a fault detection model 420 that can determine behavior that does not match normal operating behavior. For example, sensor data recorded in the event log 402 may include a spike in power draw on the power grid that is above normal for a corresponding time of day. As another example, the temperature detected on a floor of a building may be below normal, thus requiring increased heat supplied by the HVAC system to that floor.

To determine that a set of data is anomalous, the fault detection model 420 can include an autoencoder 430 trained with normal sensor data. The autoencoder 430 can encode the set of data into a feature vector and decode the feature vector according to learned parameters. Therefore, the autoencoder 430 can include, e.g., a neural network, such as, e.g., long short-term memory, a recurrent neural network, a convolutional neural network, or other machine learning technique for encoding and decoding the sensor data. Thus, the autoencoder 430 reconstructs the data according to normal expected behaviors in sensor data. Accordingly, the reconstructed data and the original set of data can be compared to determine a difference. Where the difference is high, for example, above a threshold error level, the set of data is deemed anomalous, and thus corresponding to a suspected fault.

However, the sensor data can be time varying and include asynchronous properties. Thus, to compensate for the asynchronous properties, the fault detection model 420 can include an autoregressor 440. The autoregressor 440 analyzes the sensor data to determine local linear correlations of data points in the time varying sensor data. Thus, the seasonal patterns determined from the autoencoder 430 can be augmented with the local linear correlations from the autoregressor 440 to reliably and efficiently reconstruct the sensor data, even with asynchronous time varying sensor data. As a result, a deviation from normal behavior can be more accurately and efficiently assessed.

Both the autoencoder 430 and the autoregressor 440 can be trained to reproduce data according to normal sensor data patterns. As such, the fault detection model 420 can include an optimization function for training the autoencoder 430 and the autoregressor 440 with normal sensor data, such as, e.g., a training set of curated normal sensor data. The fault detection model 420 can be trained according to, e.g., the optimization function of equation 1 below:

$$\min_{\Theta} \sum_{t}^{T} \|W \circ (D_t - \hat{D}_t)\|_F^2 + \lambda \|\Theta\|_2^2, \quad \text{Equation 1}$$

where t is time, T is the period of time corresponding to the sensor data, W is weight matrix corresponding to the sensor topology, F relates to a given fault, $D_t$ is a data point at time t of the sensor data, $\hat{D}_t$ is the reconstructed data point at time t, $\lambda$ is a bias coefficient and $\Theta$ is a vector of learned parameters. Accordingly, equation 1 determines a reconstruction error of the fault detection model 420. Therefore, the autoregressor 440 and the autoencoder 440 can each be trained via backpropagation of the reconstruction error when normal operating behavior is provided as sensor data. Thus, the fault detection model 420 can be efficiently trained to recognize normal operating behavior. A fault, therefore, can easily be determined according to a deviation from the normal operating behavior.

The deviation from the normal behavior can be determined by an anomaly evaluator 406. The anomaly evaluator 406 compared the reconstructed data from the fault detection model 420 with the original sensor data. Where the original sensor data and reconstructed sensor data deviate from each other by greater than a threshold amount, the data can be determined to indicate anomalous behavior, and thus a fault. Thus, the anomaly evaluator 406 can determine an anomaly score that quantifies the discrepancy between the sensor data and the reconstructed data. For example, an anomaly score can be determined according to equation 2 below:

$$\text{score} = \sum_{t=1}^{T} \|W \circ (D_t - \hat{D}_t)\|_F^2. \quad \text{Equation 2:}$$

Thus, the anomaly evaluator 406 quantifies and scores reconstructed data. Where the score rises above a threshold level, the data is considered anomalous. The threshold can be user adjustable, learned according to an optimization function, or predetermined for each system or type of sensor. Accordingly, the anomaly evaluator 406 can include, e.g., a software module stored in a memory device, such as, e.g., a hard drive, a solid state drive, a cache, a buffer, flash storage, random access memory, or other memory device, and executed by a processing device, such as the processing device 414 or other processing device.

Additionally, the fault detection system 400 can prioritize faults to determine an order of addressability. As such, the fault detection system 400 can rank anomalous data to determine the most severe faults for various components providing sensor data. The ranking can be, e.g., based on score, ordered from greatest to least. However, according to aspects of an embodiment, a rank can be determined according to equation 3 below:

$$r = W \circ (D_{1:t} - \hat{D}_{1:t}), \quad \text{Equation 3:}$$

where r is the rank of the sensor data.

According to the anomaly rank and/or anomaly score, sensor data can be verified as faults. However, to address the faults, the anomaly can be classified by a type or similarity to historical faults stored in, e.g., the event log 402 or an external database, with an anomaly classifier 410. By classifying the faults, the fault detection system 400 can utilize past responses to determine an appropriate response to the fault. Thus, the anomaly classifier 410 compares a fingerprint corresponding to the sensor data exhibiting anomalous behavior of a fault to fingerprints of the historical faults. The fingerprint can include top ranked anomalous behavior, according to equation 3 above, and corresponding time-varying data. The top ranked anomalous behavior can correspond to the most damaged or faulty part of the system. Thus, the ranking of anomalous behavior can be used to classify the fault as indicative of the origin of the fault.

Upon classifying the fault, the anomaly classifier 410 can determine the appropriate response according to the historical responses to similar past faults. The response can include, e.g., shutting down or restarting malfunctioning hardware, alerting an administrator or other users by an audible or visual notification using, e.g., a display 412 or network attached devices via the communication device 404, or any other appropriate response.

The components of the vault detection system 400 can include, e.g., a memory or storage to store software to perform the above described tasks. Additionally, each component can include a dedicated processing device, such as, e.g., a central processing unit (CPU), a graphical processing unit (GPU), resistive processing unit (RPU), field programmable gate array (FPGA), or other processing device. Alternatively, a processing device 414 can be in communication with one or more the components to execute the component functions.

Figure 5:
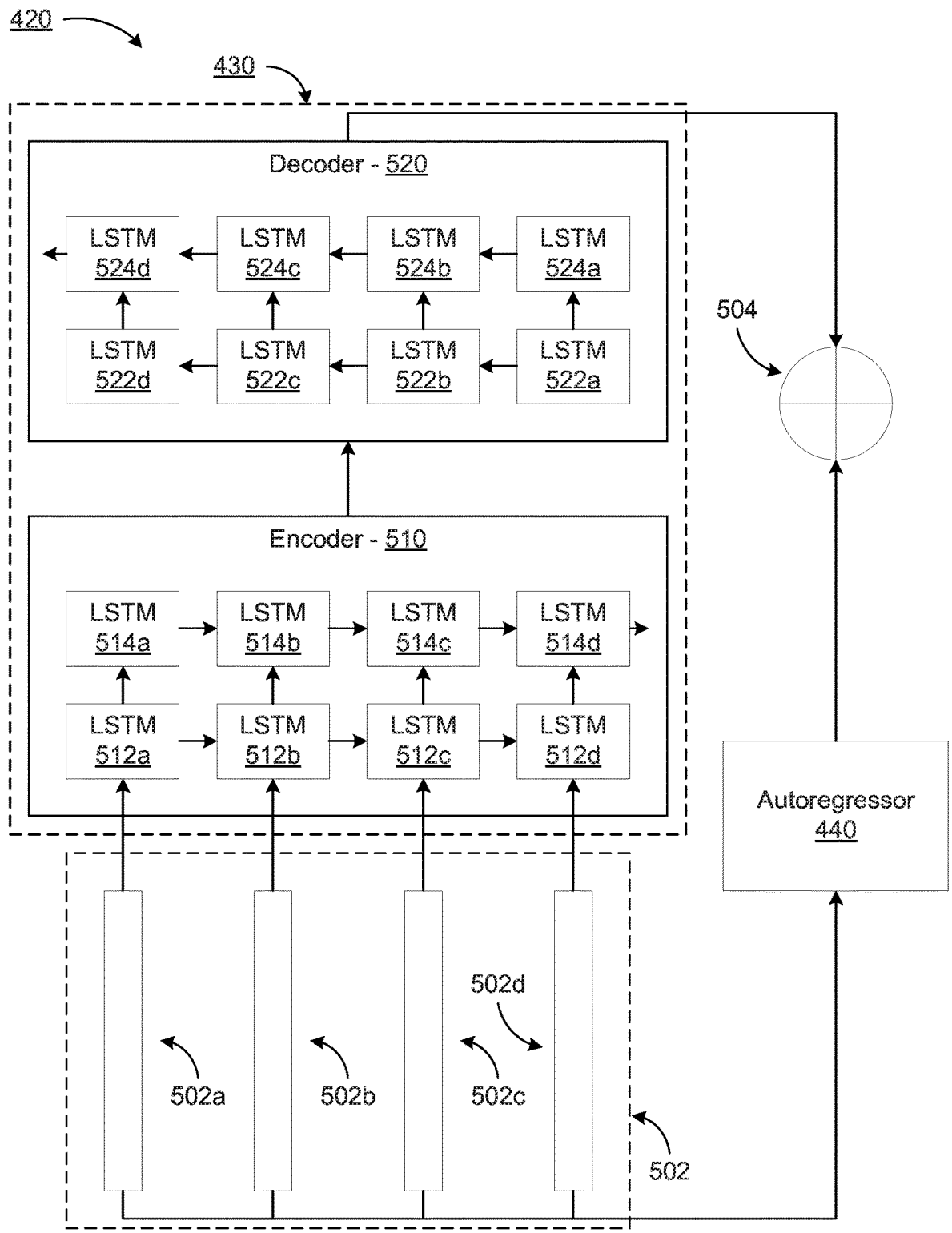
FIG. 5 is a block/flow diagram illustrating fault detection model for a fault detection system with topology-inspired neural network autoencoding, in accordance with the present invention.

Referring now to FIG. 5, a block/flow diagram illustrating fault detection model for a fault detection system with topology-inspired neural network autoencoding is illustratively depicted in accordance with an embodiment the present invention.

According to an embodiment of the present invention, a fault detection model 420, such as the fault detection model 420 described above, can include an autoencoder 430 with an encoder 510 and decoder 520, and an autoregressor 440. Each of the autoencoder 430 and the autoregressor 440 can analyze multi-variate time varying sensor data 502. The results from each of the autoencoder 430 and the autoregressor 440 can be combined in a combiner 504 to generate reproduced sensor data. Thus, the combiner 504 can be, e.g., a software module that retrieves the autoencoder 430 output and the autoregressor 440 output and combines the outputs via, e.g., vector addition, concatenation, or other combination scheme.

The sensor data 502 can include multi-variate data that is time-varying. Accordingly, the sensor data 502 can include, e.g., multiple data time-series 502a-c. To evaluate the behavior of the system, such as, e.g., a building monitoring system including HVAC, a power grid, or other sensor network, the fault detection model 420 analyzes each time-series 502a-d jointly. Thus, each of the time-series 502a-d in the sensor data 502 is provided to the encoder 510.

The encoder 510 encodes the sensor data 502 into a feature vector according to learned parameters. Therefore, the encoder 510 can include, e.g., a neural network, such as, e.g., a convolutional neural network (CNN), a recurrent neural network (RNN) or other machine learning technique. According to aspects of the present embodiment, to capture the dynamic, multi-variate nature of the sensor data 502, the encoder 510 includes a RNN. Therefore, the encoder 510 is constructed with one or more neurons such as, e.g., long short-term memory (LSTM) units or gated recurrent units, among others. For example, the encoder 510 can include a first layer of LSTM units 512a-d and a second layer of LSTM units 514a-d. However, more layers are contemplated.

Thus, each time-series 502a-d is communicated to a corresponding LSTM unit 512a-d. The LSTM units 512a-d output respective hidden states according to learned parameters, that are supplied to each LSTM unit 512a-d of the first layer as well as passed on to the LSTM units 514a-d of the second layer. The LSTM units 514a-d similarly output hidden states according to learned parameters. The hidden states are used to form a feature vector that represents the encoded sensor data 502.

The feature vector is then provided to the decoder 520. Similar to the encoder 510, the decoder 520 includes, e.g., a neural network. According to aspects of the present embodiment, the decoder 520 includes a RNN with LSTM units 522a-d, 524a-d of corresponding number to the encoder 510 LSTM units 512a-d and 514a-d. The feature vector is provided to a first LSTM unit 522a, which generates a hidden state from learned parameters. The hidden state is passed to each other LSTM unit 522a-d, 524a-d.

The second layer of LSTM units 524a-d generates vectors corresponding to each of the LSTM units 524a-d. As a result, the decoder 520 generates vectors that correspond to each of the time series 502a-d of the sensor data 502. The vectors represent reconstructed sensor data according to the learned parameters of the autoencoder 430.

The learned parameters for each of the LSTM units 512a-d, 514a-d, 522a-d and 524a-d are jointly trained using training data including normal operating behavior of the monitored system. As a result, the autoencoder 430 is trained to reconstruct sensor data 502 according to normal operating behavior. Therefore, if the sensor data 502 includes anomalous operating behavior, the generated vectors from the decoder 520 will differ from the sensor data 502. However, the sensor data 502 includes normal operating behavior, then the generated vectors and the sensor data 502 will match within a degree of acceptable error.

The degree of acceptable error can include a threshold that is, e.g., learned, predetermine, or user selectable. Moreover, the error between the generated vectors and the sensor data 502 can be evaluated according to an error function, such as, e.g., equation 1 described above.

However, the autoencoder 430 may not accurately account for a lack synchronicity between the time-series 502a-d. Accordingly, the reconstructed sensor data can be augmented with the autoregressor 440. The autoregressor 440 can determine a regression to model each time-series 502a-d using the time-series 502a-d as input. Thus, the autoregressor 440 can model the time-series 502a-d using, e.g., equation 4 below:

$$Y_t = c + \Sigma_{i=1}^{P} \rho_i D_{t-i} + \epsilon_t, \quad \text{Equation 4:}$$

where Y is reconstructed data according to autoregression, c is a constant, i is a data point with a time-series of the sensor data, p is the total number of data points, $\rho$ is a learned parameter, D is a vector of sensor data, $\epsilon$ is a white noise vector and t is time.

The modeled time-series from the autoregressor 440 can be used to augment the reconstructed sensor data generated by the autoencoder 430, such as, e.g., by adding the modeled time-series to the reconstructed sensor data. As a result, the fault detection model 420 generates reconstructed sensor data that takes into account multi-variate time-series with asynchronous behaviors. Thus, the reconstructed behavior can be generated more efficiently and accurately. Furthermore, the reconstructed sensor data is compared against the original sensor data 502 to quickly determine whether anomalous behavior exists. This process is efficient for finding faults because storage space and processing resources are not needed to match sensor data 502 to particular fault behaviors.

Figure 6:
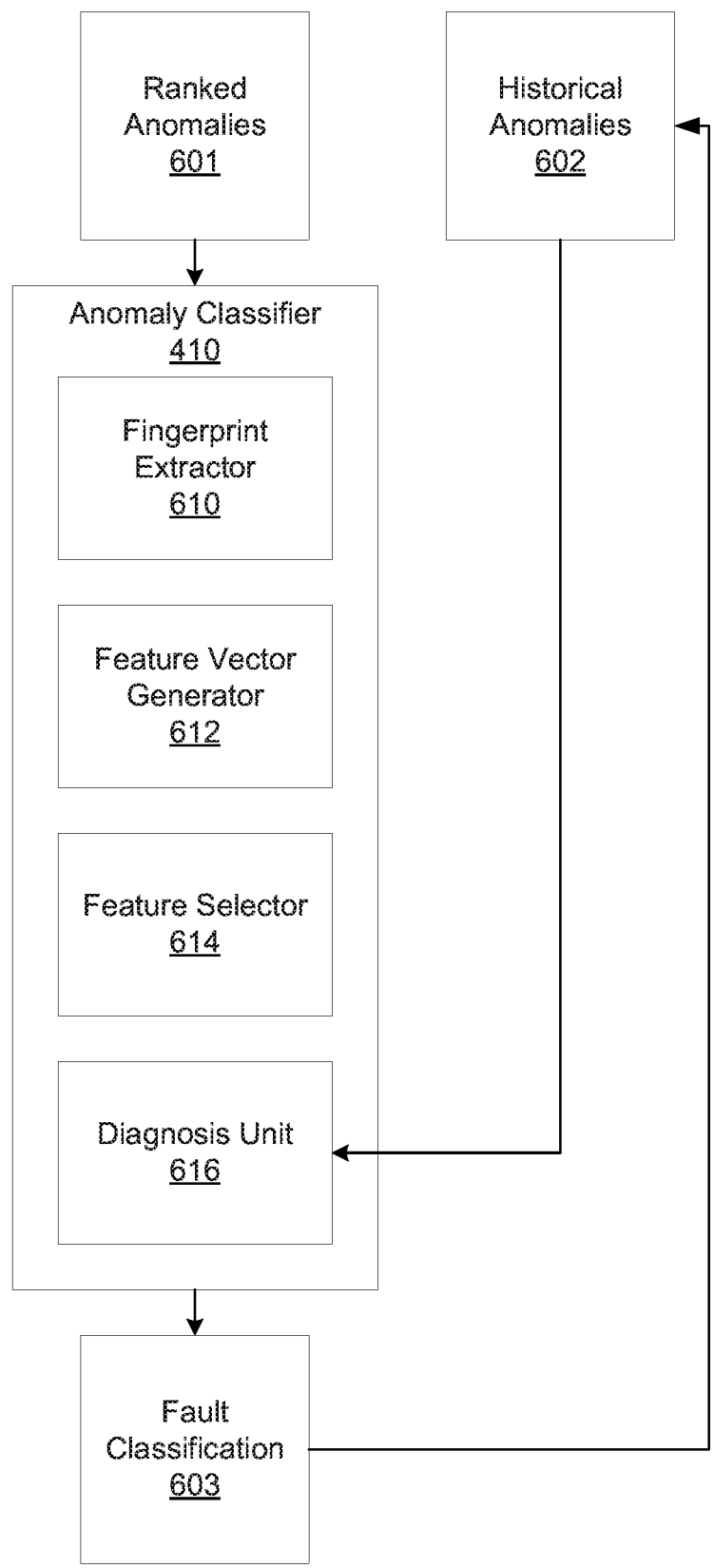
FIG. 6 is a block/flow diagram of an anomaly classifier for classifying anomalies detected by a fault detection model, in accordance with the present invention.

Referring now to FIG. 6, a block/flow diagram of an anomaly classifier for classifying anomalies detected by a fault detection model is illustratively depicted in accordance with an embodiment the present invention.

According to aspects of the present invention, detected anomalies can be ranked as described with reference to FIG. 4 above. The ranked anomalies 601 can be provided to an anomaly classifier 410, such as the anomaly classifier 410 of FIG. 4 described above, along with historical anomalies 602 provided by, e.g., an event log or a database or other storage device. The anomaly classifier 410 examines the ranked anomalies 601 and corresponding behavior fingerprints to produce a fault classification 603.

To produce the fault classification 603, a fingerprint extractor 610 extracts a fingerprint from each of the ranked anomalies 601. The fingerprint can include, e.g., one or more time-series across the multi-variate sensor data exhibiting anomalous behavior, however other methods of fingerprinting are contemplated. Thus, the fingerprint extractor 610 formats the ranked anomalies 601 according to the anomalous behavior and chronology associated with the anomalous behavior. The fingerprint can be represented as a fingerprint matrix of the time-series data representing the top ranked anomalies of the ranked anomalies 601.

The fingerprint matrix can be converted into a feature vector using a feature vector generator 612. The feature vector generator 612 can, e.g., form the feature vector by separating either each row or each column of the fingerprint matrix, and appending the rows or columns into a single vector. However, other conversion techniques for converting a matrix to vector are also contemplated.

Using the feature vector, a feature selector 614 selects features to select the most informative anomalies, such as, e.g., broken dependencies between system components. The feature selector 614 can include any feature selection technique, including, e.g., a greedy algorithm, LASSO method, wrapper method, filter, ranked correlation, a Markov blanket, minimum-redundancy-maximum-relevance (mRMR), or other suitable feature selection technique. However, according to aspects of the present invention, the feature selector 614 employs a Chi Square feature selection technique.

A diagnosis unit 616 uses the selected features of the feature vector to diagnose the anomalies. Because the anomalies are determined based on deviation from normal operating behaviors, the anomalies can be diagnosed by comparing the deviation using the selected features with historical anomalies 602. The historical anomalies 602 can include previously detected and addressed anomalies in the system. As such, each of the historical anomalies 602 can include a fingerprint, as well as failure reasons and annotations for possible actions to remedy or mitigate the respective failure. Thus, the features of the historical anomalies 602 can be compared to the selected features of the ranked anomalies 601. Thus, the diagnosis unit 616 determines a degree of similarity between the ranked anomalies 601 and the historical anomalies 602 using, e.g., Jaccard distance.

Accordingly, the diagnosis unit 616 produces a similarity score corresponding to the Jaccard distance between each of the ranked anomalies 601 and the historical anomalies 602. A learned or a user selectable similarity threshold can be employed to determine whether the ranked anomalies 601 are similar to any of the historical anomalies 602 according to the Jaccard distance.

Where the similarity score exceeds a threshold value, the ranked anomalies 601 and the corresponding historical anomaly are deemed similar. Thus, the ranked anomalies 601 are diagnosed as the failure of the similar historical anomaly. The diagnosis unit 616 thus produces a fault classification 603 for the ranked anomalies 601 that includes, e.g., the failure reasons and the possible action annotations of the similar historical anomaly. The fault classification 603 can then be analyzed for automatic remediation according to the possible action annotations. Alternatively, or in addition, the fault classification 603 can be provided to a user or administrator with the failure reasons and possible action annotations displayed on a display.

However, where the ranked anomalies 601 do not have a similarity score with any historical anomaly 603 that exceeds the threshold, then a fault classification 603 is generated as new event and assigned to a category associated with the most similar historical anomaly 602. Because the ranked anomalies 601 are not similar to a particular historical anomaly 602, the fault classification 603 can exclude any failure reasons or possible actions. However, the fault classification 603 can, alternatively, include the failure reasons and possible action annotations of each of the historical anomalies in the assigned category. The fault classification 603 can then be provided to a user or administrator, e.g., via a display.

Figure 7:
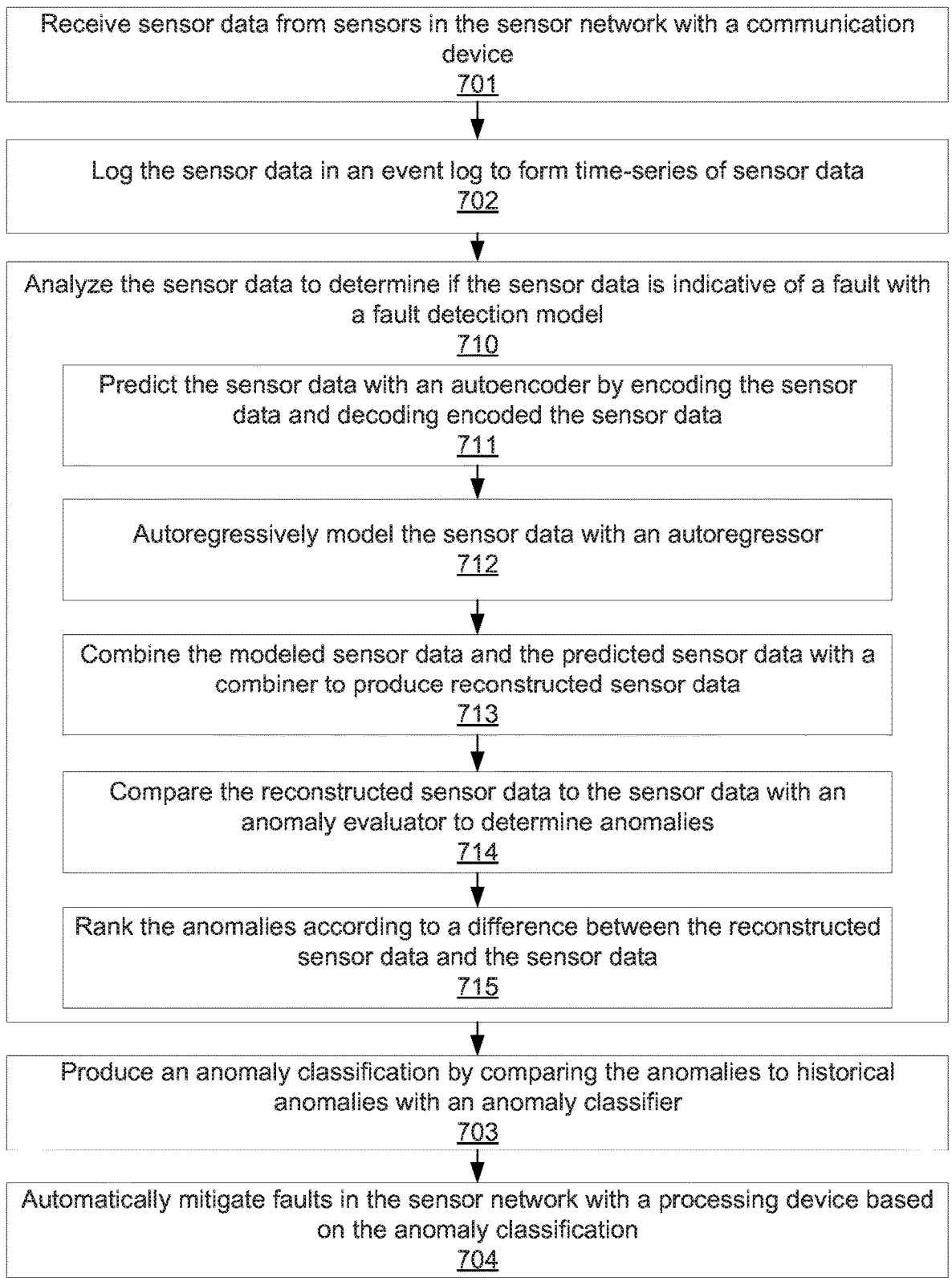
FIG. 7 is a flow diagram illustrating a system/method for topology-inspired neural network autoencoding for fault detection, in accordance with the present invention.

Referring now to FIG. 7, a flow diagram illustrating a system/method for topology-inspired neural network autoencoding for fault detection is illustratively depicted in accordance with an embodiment the present invention.

At block 701, sensor data is received from sensors in the sensor network with a communication device.

At block 702, the sensor data is logged in an event log to form time-series of sensor data.

At block 710, the sensor data is analyzed to determine if the sensor data is indicative of a fault with a fault detection model, the fault detection model including; at block 711, predicting the sensor data with an autoencoder by encoding the sensor data and decoding encoded the sensor data, at block 712, autoregressively modelling the sensor data with an autoregressor, at block 713, combining the modeled sensor data and the predicted sensor data with a combiner to produce reconstructed sensor data, at block 714, comparing the reconstructed sensor data to the sensor data with an anomaly evaluator to determine anomalies, and, at block 715, ranking the anomalies according to a difference between the reconstructed sensor data and the sensor data.

At block 703, an anomaly classification is produced by comparing the anomalies to historical anomalies with an anomaly classifier.

At block 704, faults in the sensor network are automatically mitigated with a processing device based on the anomaly classification.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for fault detection in a sensor network, the method comprising:
receiving sensor data from sensors in the sensor network with a communication device;
analyzing the sensor data to determine if the sensor data is indicative of a fault with a fault detection model, the fault detection model including:
predicting the sensor data with an autoencoder by encoding the sensor data and decoding encoded the sensor data;
autoregressively modelling the sensor data with an autoregressor;
combining the modeled sensor data and the predicted sensor data with a combiner to produce reconstructed sensor data;
augmenting the reconstructed sensor data using the autoregressor to account for a lack of synchronicity between sensor data from two or more time-series, the two or more time series being modeled by:

$$Y_t = c + \sum_{i=1}^{P} \rho_i D_{t-i} + \underline{\epsilon}_t,$$

where Y is reconstructed sensor data according to the autoregression, c is a constant, i is a data point with a time series of the sensor data, p is a total number of data points, ρ is a learned parameter, D is a vector of the sensor data, $\underline{\epsilon}$ is a white noise vector, and t is a time;
comparing the reconstructed sensor data to the sensor data with an anomaly evaluator to determine anomalies;
producing an anomaly classification by comparing the anomalies to historical anomalies with an anomaly classifier; and
automatically mitigating faults in the sensor network with a processing device by at least one of shutting down or resetting a faulty portion of the sensor network based on the anomaly classification.

2. The method as recited in claim 1, further including ranking the anomalies according to a difference between the reconstructed sensor data and the sensor data.

3. The method as recited in claim 1, further including logging sensor data in an event log to form time-series of sensor data.

4. The method as recited in claim 1, wherein encoding the sensor data and decoding the encoded sensor data includes generating hidden states with long short-term memory units in a recurrent neural network in the autoencoder.

5. The method as recited in claim 1, wherein comparing the reconstructed sensor data to the sensor data includes determining a reconstruction error.

6. The method as recited in claim 5, further including training the autoencoder and the autoregressor according to the reconstruction error corresponding to sensor data associated with normal operating behavior.

7. The method as recited in claim 1, wherein producing the anomaly classification includes:
extracting a fingerprint of the anomalies; and
comparing the fingerprint to historical anomaly fingerprints.

8. The method as recited in claim 7, further including extracting features from the fingerprint according to importance.

9. The method as recited in claim 1, further including adding the anomalies and the mitigation to the historical anomalies.

10. A method for fault detection in a sensor network, the method comprising:
receiving sensor data from sensors in the sensor network with a communication device;
logging sensor data in an event log to form time-series of sensor data;
analyzing the sensor data to determine if the sensor data is indicative of a fault with a fault detection model, the fault detection model including:
predicting the sensor data with an autoencoder by encoding the sensor data and decoding encoded the sensor data;
autoregressively modelling the sensor data with an autoregressor;
combining the modeled sensor data and the predicted sensor data with a combiner to produce reconstructed sensor data;
augmentin the reconstructed sensor data using the autoregressor to account for a lack of synchronicity between sensor data from two or more time-series, the two or more time series being modeled by:

$$Y_t = c + \sum_{i=1}^{P} \rho_i D_{t-i} + \underline{\epsilon}_t,$$

where Y is reconstructed sensor data according to the autoregression, c is a constant, i is a data point with a time series of the sensor data, p is a total number of data points, ρ is a learned parameter, D is a vector of the sensor data, $\underline{\epsilon}$ is a white noise vector and t is a time;
comparing the reconstructed sensor data to the sensor data with an anomaly evaluator to determine anomalies;
ranking the anomalies according to a difference between the reconstructed sensor data and the sensor data;
producing an anomaly classification by comparing the anomalies to historical anomalies with an anomaly classifier; and
automatically mitigating faults in the sensor network with a processing device by shutting down systems and equipment determined to be malfunctioning based on the anomaly classification.

11. The method as recited in claim 10, wherein encoding the sensor data and decoding the encoded sensor data includes generating hidden states with long short-term memory units in a recurrent neural network in the autoencoder.

12. The method as recited in claim 10, wherein comparing the reconstructed sensor data to the sensor data includes determining a reconstruction error.

13. The method as recited in claim 12, further including training the autoencoder and the autoregressor according to the reconstruction error corresponding to sensor data associated with normal operating behavior.

14. The method as recited in claim 10, wherein producing the anomaly classification includes:
extracting a fingerprint of the anomalies; and
comparing the fingerprint to historical anomaly fingerprints.

15. The method as recited in claim 14, further including extracting features from the fingerprint according to importance.

16. The method as recited in claim 10, further including adding the anomalies and the mitigation to the historical anomalies.

17. A sensor network with a fault detection system to detect faults, the system comprising:
- a communication device that receives sensor data from sensors in the sensor network;
- a fault detection model that analyzes the sensor data to determine if the sensor data is indicative of a fault, the fault detection model including:
  - an autoencoder that encodes the sensor data and decodes the encoded sensor data to predict the sensor data;
  - an autoregressor that autoregressively models the sensor data;
  - a combiner that combines the modeled sensor data and the predicted sensor data to produced reconstructed sensor data, wherein the reconstructed sensor data is augmented using the autoregressor to account for a lack of synchronicity between the sensor data from a time-series the time series being modeled by:

$$Y_t = c + \Sigma_{i=1}^{p} \rho_i D_{t-i} + \epsilon_t,$$

where Y is reconstructed sensor data according to the autogregression, c is a constant, i is a data point with the time series of the sensor data, p is a total number of data points, $\rho$ is a learned parameter, D is a vector of the sensor data, $\epsilon$ is a white noise vector, and t is a time;
  - an anomaly evaluator that compares the reconstructed sensor data to the sensor data to determine anomalies;
  - an anomaly classifier that compares the anomalies to historical anomalies and produces an anomaly classification; and
- a processing device that automatically mitigates faults in the sensor network by at least one of shutting down or resetting devices determined to be faulty based on the anomaly classification.

18. The method as recited in claim 10, further including an anomaly ranker that ranks the anomalies according to a difference between the reconstructed sensor data and the sensor data.

19. The method as recited in claim 10, further including an event log that logs sensor data to form time-series of sensor data.

20. The method as recited in claim 10, wherein the autoencoder includes long short-term memory units in a recurrent neural network that encodes the sensor data and decodes the encoded sensor data by generating hidden states.

* * * * *